(12) United States Patent
Schott

(10) Patent No.: US 6,349,017 B1
(45) Date of Patent: Feb. 19, 2002

(54) MAGNETIC HEAD SUSPENSION ASSEMBLY USING BONDING PADS OF A SLIDER TO AN ATTACHMENT SURFACE OF A FLEXURE

(75) Inventor: Daniel P. Schott, San Jose, CA (US)

(73) Assignee: Read-Rite Corporation, Milpitas, CA (US)

( * ) Notice: Subject to any disclaimer, the term of this patent is extended or adjusted under 35 U.S.C. 154(b) by 512 days.

(21) Appl. No.: 08/803,578

(22) Filed: Feb. 21, 1997

(51) Int. Cl.[7] .................................................. G11B 5/48
(52) U.S. Cl. ..................... 360/234.6; 360/104; 360/103; 360/234.5
(58) Field of Search ................................ 360/104, 103, 360/234.5, 234.6

(56) References Cited

U.S. PATENT DOCUMENTS

| | | | | |
|---|---|---|---|---|
| 4,789,914 A | * | 12/1988 | Ainslie et al. ............ 360/234.5 |
| 5,331,489 A | * | 7/1994 | Johnson et al. ............. 360/104 |
| 5,530,604 A | * | 6/1996 | Pattanaik ..................... 360/104 |
| 5,644,454 A | * | 7/1997 | Arya et al. ............. 360/104 X |
| 5,657,186 A | * | 8/1997 | Kudo et al. ................. 360/104 |

* cited by examiner

Primary Examiner—William Korzuch
(74) Attorney, Agent, or Firm—Nathan N. Kallman

(57) ABSTRACT

A magnetic head suspension assembly includes a load beam, a flexible member or flexure, and an air bearing slider. Disposed on the flexible member is a plurality of bonding pads. Bonding pads are also formed on the edge surfaces of the slider. The bonding pads of the slider and the corresponding bonding pads on the flexible member are attached to each other via bonding joints. One of the bonding pads is electrically linked to an electrostatic discharge (ESD) path and the other bonding pads are connected to electrical signal traces which convey electrical signals to and from magnetic transducers. The undesirable steps of epoxy application for adhering a slider to a flexure can be eliminated, thus resulting in a more reliable and accurately oriented slider in a magnetic head suspension assembly.

12 Claims, 6 Drawing Sheets

MAGNETIC HEAD SUSPENSION ASSEMBLY USING BONDING PADS OF A SLIDER TO AN ATTACHMENT SURFACE OF A FLEXURE

FIELD OF THE INVENTION

This invention relates to magnetic head suspensions and in particular to the attachment of an air bearing slider to a magnetic head suspension.

BACKGROUND OF THE INVENTION

Typically, a disk drive contains a number of magnetic disks attached to a common spindle for rotation. The surfaces of the magnetic disks have an associated head arm assembly which includes a head gimbal assembly (HGA). The head arm assemblies are generally attached to an actuator for positioning magnetic transducers formed with the HGAs with reference to data tracks on the magnetic disks. An HGA typically comprises a load beam, a flexible element or a flexure, and a slider. The flexure has one end attached to the load beam while the slider is joined to the other end of the flexure. The slider carries one or more transducers at it trailing edge, as is well known in the art. Transducer wires are connected to the transducers to conduct signals between the transducers and head circuitry.

To achieve shorter data seeking time, disk drives are designed not only with fast spinning disks, but also with rapidly moving head suspensions for accessing the data tracks registered on the storage disks. For these reasons, the slider must be securely attached to the flexure. Moreover, the constant motion of the slider and the frictional action of the slider results in an accumulation of electrostatic charge of sufficient magnitude which can be detrimental to the magnetic head. Accordingly, a well designed magnetic head suspension should incorporate an efficient electrostatic discharge (ESD) path for the slider in the gimbal assembly.

The HGA serves to dynamically adjust the orientation of the slider to conform to the disk surface while the disk is spinning. The topology of the disk surface, though highly polished, is not uniform if viewed at a microscopic scale. Moreover, the disk surfaces are not rotating about the common shaft at a perfectly perpendicular angle. A minute angular deviation would translate into varying disk-to-slider distances while the disk is spinning. For reliable data writing and reading, the slider thus has to faithfully follow the topology of the spinning disk.

Sliders are commonly attached to the flexure with adhesives that are resilient and are capable of buffering the thermal mismatches between the slider and the flexure. However, the use of adhesive to secure the slider to the flexure is undesirable because the manufacturing process is time-consuming and tedious. Applying an adhesive involves dispensing more than one adhesive component, for example, the epoxy base and the hardening agent. During production, the adhesive components are thoroughly mixed prior to application. After the adhesive is dispensed in a predetermined pattern on either the slider or the flexure, the slider is carefully aligned with the flexure for attachment. The amount of adhesive and the pattern need to be carefully controlled. Excessive adhesive may result in spillover causing undesirable problems. Deficiency in adhesive may compromise the overall adhesive effect. The adhesive is thereafter cured by exposing the epoxy pattern to ultraviolet (UV) light. As a further safeguard, the attached slider normally undergoes another elevated temperature curing process within the temperature range of between 100° C.–200° C.

The selected pattern on the flexure for UV light exposure has to be carefully designed. Normally, several openings are formed on the flexure as shown in FIG. 9. UV light is illuminated from the back side of the flexure through the openings. The gap between the slider and the flexure allows the UV light to disperse and permeate the adhesive. If the openings are too large, the adhesive force per areal unit is reduced. On the other hand, if the openings are too small, there may be insufficient UV light to pass through which may result in spotty areas of uncured adhesives. Thus, the slider may separate from the flexure during operation of the disk drive. Furthermore, outgassing from uncured adhesives are sources of contamination in the disk drive.

The number of manufacturing steps can be reduced with the use of single-component adhesives. In such cases, the processes of premixing the constituent components are avoided. However, the subsequent steps of UV curing light and high-heat annealing are still required. The elevated temperatures in the curing and annealing processes may be damaging to the read/write transducers disposed on the air bearing slider. Consequently, production yield may be undesirably reduced.

Even with the advent of automatic manufacturing processes in magnetic head suspension fabrication, the adhesives are still commonly dispensed manually with potential contamination. The harmful effect of constant UV light exposure to the operator is also of concern.

In addition to the tedious processes mentioned above, the use of adhesives is not very effective in regard to ESD dissipation. As mentioned before, electrostatic charge built up in the slider during constant movements needs to be effectively discharged. If the assembly is electrically isolated, the built-up electrostatic charge can affect data integrity and can even damage the magnetic head. With the conventional method, the discharge is realized via conducting charge through the adhesive with metallic particles. The high resistance value substantially impedes any efficient flow of electrostatic discharge. Therefore relying on the cured adhesives for ESD protection does not appear to be a viable solution.

SUMMARY OF THE INVENTION

It is an object of the invention to provide a magnetic head suspension assembly with a slider reliably and economically attached to the assembly.

It is another object of the invention to provide a magnetic head suspension assembly having an effective ESD path.

It is a further object of the invention to provide a magnetic head suspension having an air bearing slider attached to the suspension without annealing and curing processes, thereby realizing an improved production yield.

In accordance with this invention, a magnetic head suspension includes a load beam, a flexible member or flexure, and a slider, wherein a plurality of bonding pads are disposed on the flexure. Formed on the edge surfaces of the slider is another plurality of bonding pads. The bonding pads of the slider and the corresponding bonding pads on the flexure are attached to each other via bonding joints. In the preferred embodiment, the bonding joints are attached to the bonding pads through ultrasonic means. In the final head assembly, one of the bonding pads is electrically tied to the electrostatic discharge (ESD) path, and the other bonding pads are connected to electrical signal traces which are linked to the read and write transducers. Thus, the time-consuming steps of epoxy application can be avoided resulting in a more reliable and accurately oriented slider in the final magnetic head suspension assembly.

BRIEF DESCRIPTION OF THE DRAWINGS

The invention will be described in greater detail with reference to the drawings in which.

Like reference numerals refer to like parts.

DETAILED DESCRIPTION OF THE INVENTION

Figure 1:
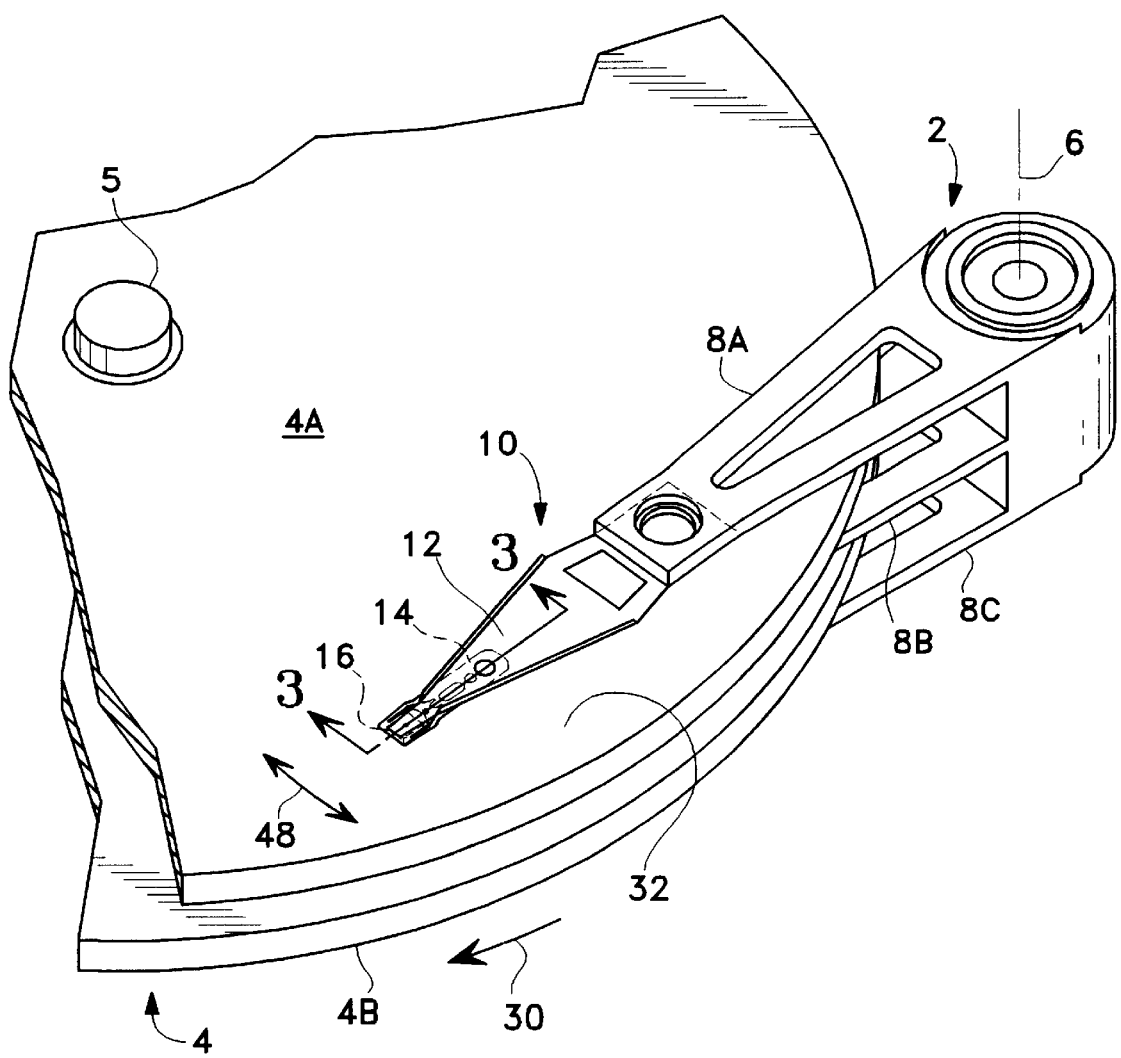
FIG. 1 is a fragmentary view of an exemplary use of the magnetic head suspension of the invention.

FIG. 1 illustrates an actuator arm assembly 2 and a stack of spaced apart disks 4 rotatable about a common spindle 5. The actuator arm assembly 2 is also rotatable about an actuator arm axis 6. The arm assembly 2 includes actuator arms 8A–8C which extend into the spacings between the disks 4A and 4B. Attached to each of the actuator arms 8A–8C is a magnetic head suspension 10, which comprises a resilient load beam 12, a flexible member or flexure 14 and an air bearing slider 16.

Figure 2:
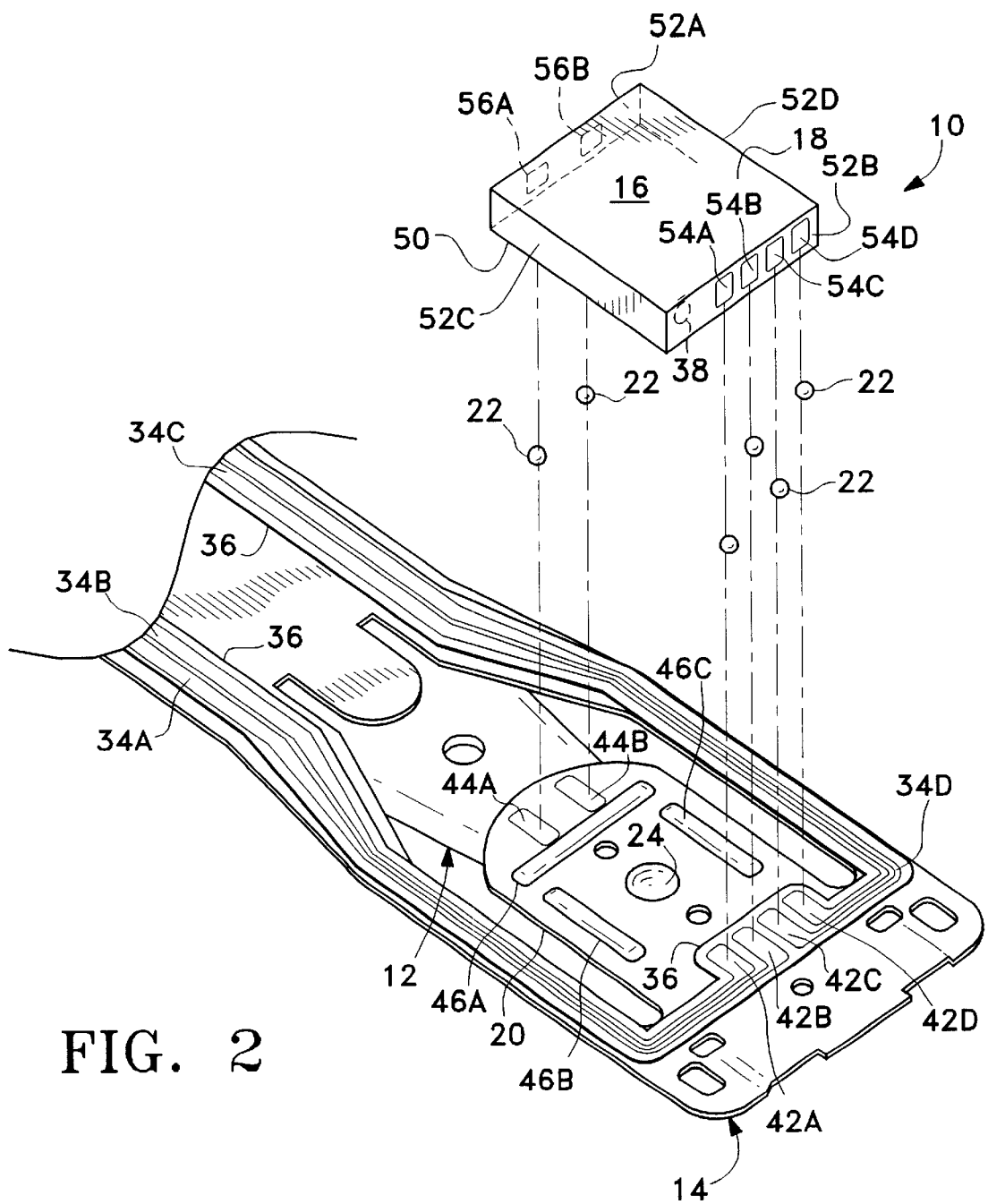
FIG. 2 is an exploded view, partly broken away, of the gimbal assembly of the magnetic head suspension as shown in FIG. 1.

FIG. 2 illustrates the magnetic head suspension 10 in further detail. In FIG. 2, the air bearing surface (ABS) 18 of the slider 16 is exposed. As shown, the flexure 14 is disposed between the load beam 12 and the slider 16. The slider 16 is fixedly attached to the tongue portion 20 of the flexure 14 via the bonding joints 22. Disposed on the flexure 14 are electrical signal traces 34A–34D which are dielectrically separated from the flexure 14 by a thin layer of insulating material 36. In the preferred embodiment, the insulating material 36 is made of polyimide. Atop the insulating material 36 is also a plurality of signal bonding pads 42A–42D connected to the respective electrical signal traces 34A–34D. In this embodiment, after the slider 16 is attached to the flexure 14 (shown in FIGS. 5 and 6), signal traces 34A and 34B are electrically connected to a magnetic transducer 38 disposed on the slider 16.

In addition to the signal pads 42A–42D and the signal traces 34A–34D, ESD bonding pads 44A and 44B are disposed on the tongue portion 20. The ESD pads 44A and 44B are directly disposed on the flexure 14 without any insulating layer interposed therebetween. Formed on the tongue portion 20 are several ridges 46A–46C which perform the duty of supporting the slider 18 after attachment.

Figure 3:
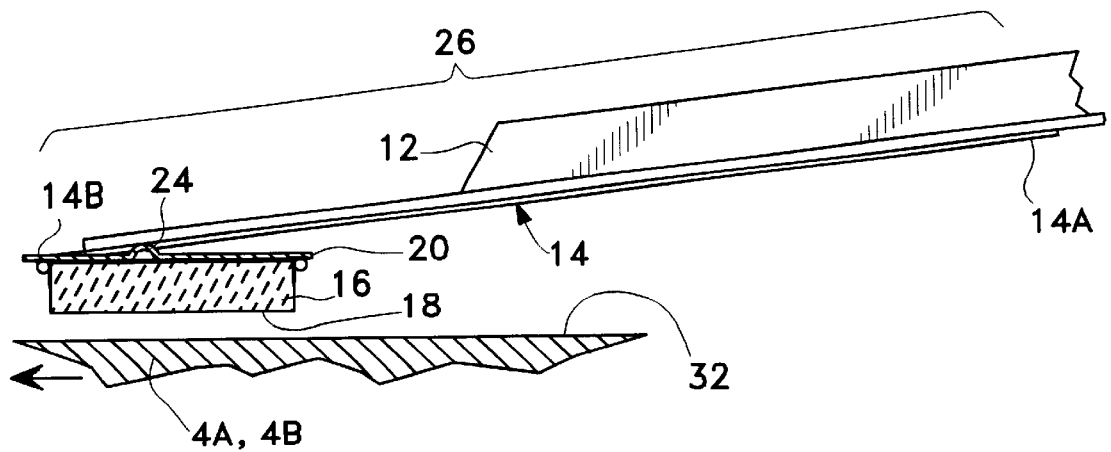
FIG. 3 is a cross-sectional side view taken along the line 3—3 of FIG. 1.
Figure 4:
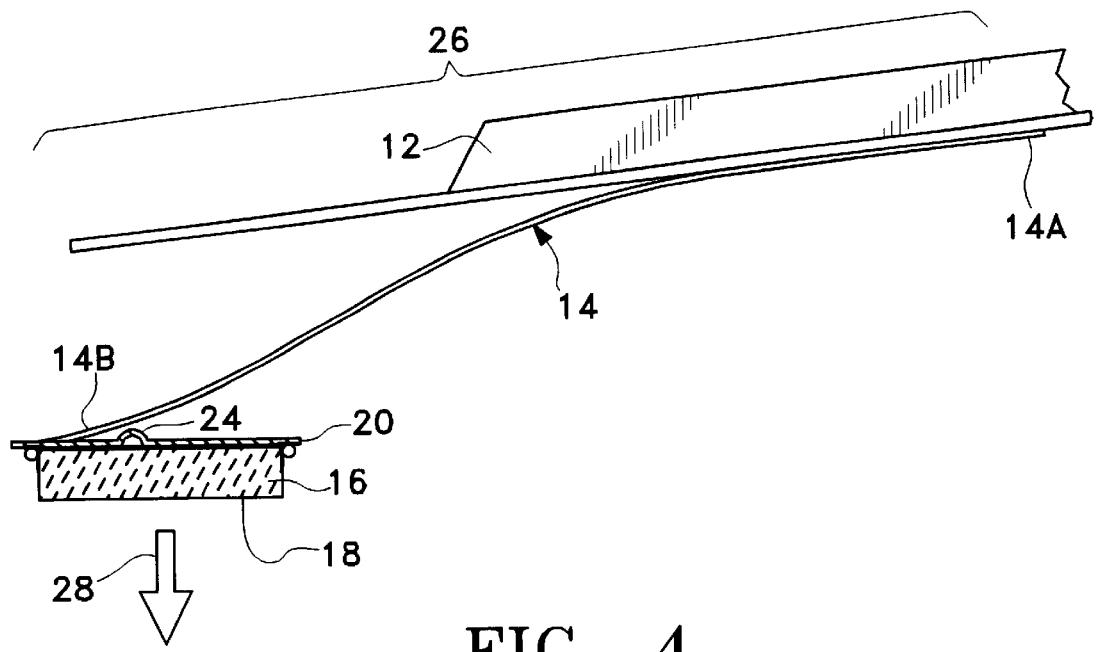
FIG. 4 is a cross-sectional side view of FIG. 3 with the slider displaced from the load beam illustrating the attachment relationship of the various components of the gimbal assembly.

Stamped on the tongue portion 20 is a dimple 24 which is convex in shape directed toward the load beam 12. The slider 16 and the flexure 14 with the dimple constitute the head gimbal assembly of the magnetic head suspension 10, as shown in FIGS. 3 and 4. It should be noted that, as an alternative, the dimple 24 can be stamped on the load beam 12 so that the dimple 24 on the load beam 12 would be urged against the tongue portion 20 of the flexure 14.

With reference to FIG. 3, the flexure 14 has a proximal end 14A which is affixed to the load beam 12, and a distal end 14B which is attached to the slider 16 via the tongue portion 20. FIG. 4 shows the physical relationship of the load beam 12, the flexure 14, and the slider 16 in further detail. When the slider 16 is pulled in the direction of ther arrow 28, one fixed area of attachment is between the proximal end 14A of the flexure 14 and the load beam 12, and the other area of attachment is between the slider 16 and the tongue portion 20 of the flexure 14. The dimple 24 which is against the load beam 12 provides gimbaling action of the suspension assembly 10.

With reference to FIG. 1, during disk drive operation, the disks 4 spin at high angular speed in the direction of the arrow 30 about the spindle 5. The aerodynamics of the moving air between the slider 16 and the disk surface 28 provides sufficient air cushioning to float the slider 16 above the disk surface 32. At the same time, the spring force of the resilient load beam 12 pushes the slider toward the disk surface 28. An equilibrium point is reached at which the slider 16 flies over the disk surface 28 at a substantially constant spacing.

During data seeking, the actuator arm 8A moves the slider across the disk surface 32 in directions 48 at a rapid rate. The large force associated with the swift acceleration and deceleration is exerted on the slider 16. As a result, the slider 16 has to be firmly attached to the flexure 14. In prior art devices, sliders are glued onto the flexures with epoxy. As mentioned before, the use of epoxy has disadvantages. In the magnetic head suspension of the invention, the slider 16 is attached to the flexure 14 through metallic joints.

FIG. 2 shows the metallic joints 22. The slider 16 has an air bearing surface (ABS) 18 and an opposing surface 50. The slider is formed with edge surfaces 52A–52D. As shown in FIG. 2, the leading and trailing edge surfaces are labeled 52A and 52B, respectively and the side edge surfaces are designated by the reference numerals 52C and 52D. Disposed on the trailing edge surface 52B are bonding pads 54A–54D. Signal pads 54A–54D are electrically connected to the read/write transducer 38 disposed on the slider 16. A pair of bonding pads 56A and 56B are positioned on the leading edge surface 52A in a similar fashion.

The bonding pads 54A–54D, 56A and 56B on the slider 16 are attached to corresponding signal pads 42A–42D and ESD pads 44A and 44B, respectively, through the bonding joints 22, preferably made of gold or silver.

Figure 5:
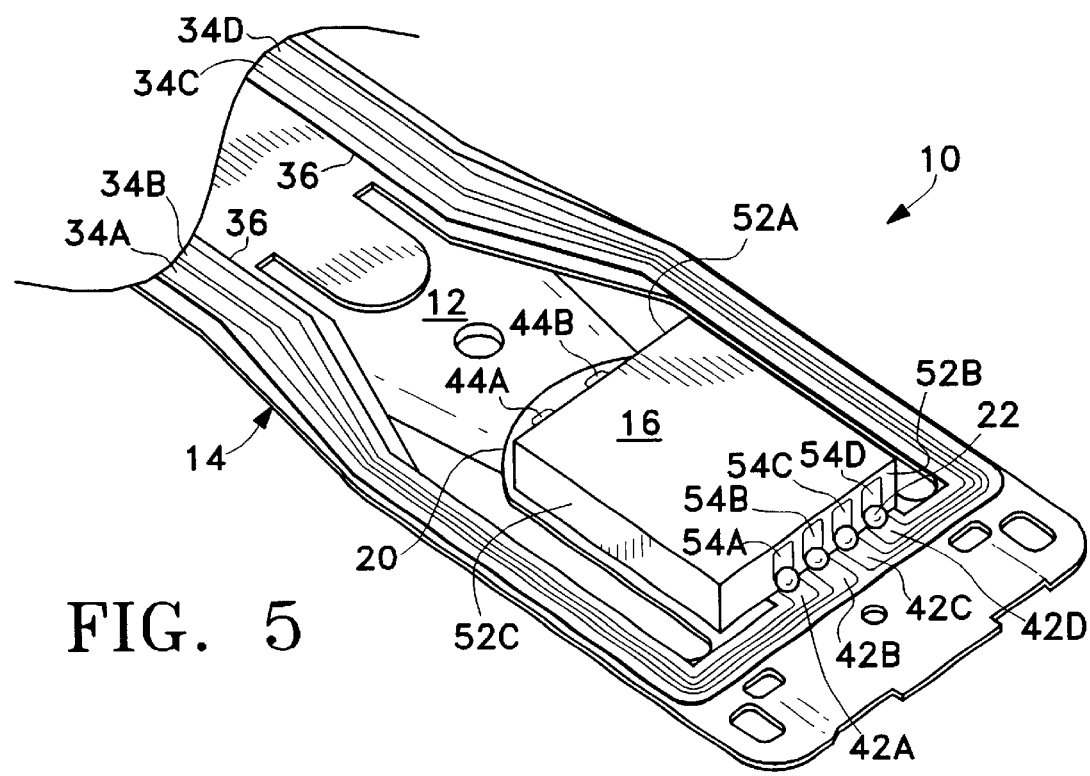
FIG. 5 is an isometric view of an assembled gimbal assembly in accordance with the invention showing the slider's air bearing surface and trailing edge.
Figure 6:
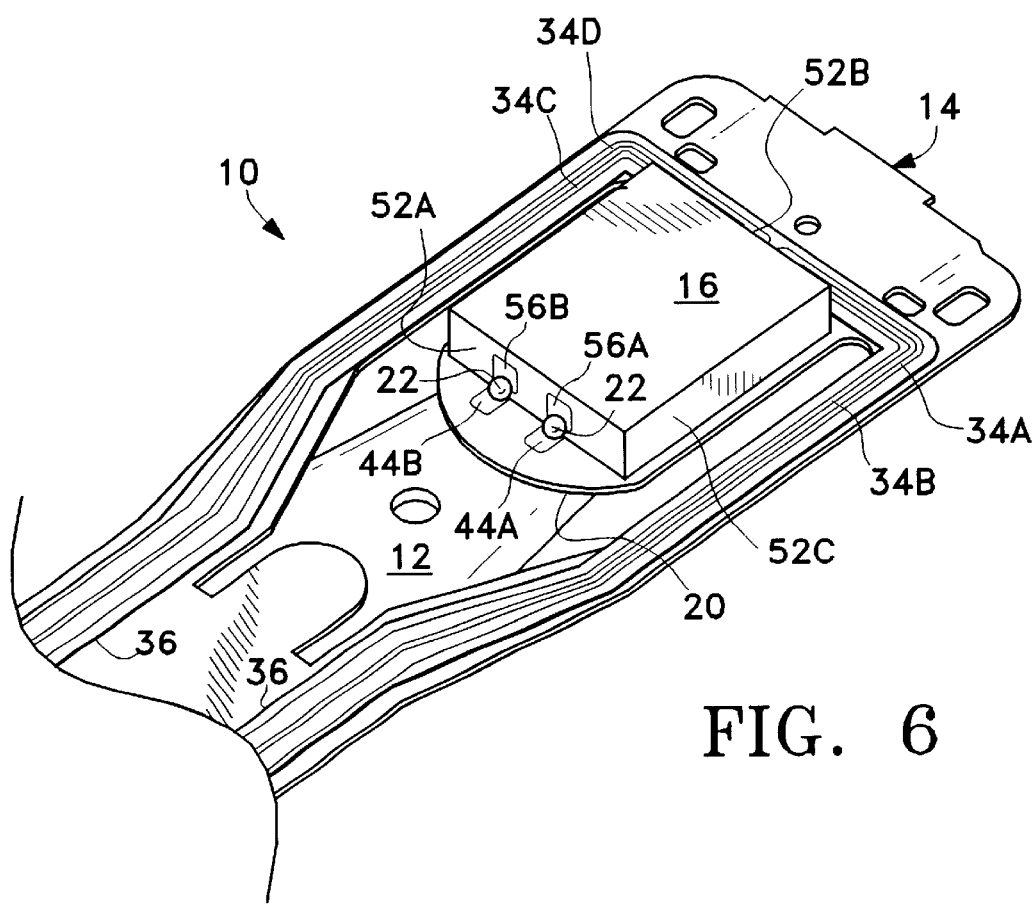
FIG. 6 is an isometric view of an assembled gimbal assembly in accordance with the invention showing the slider's air bearing surface and leading edge.

FIGS. 5 and 6 are isometric views partially illustrating a fully assembled magnetic head suspension 10. FIG. 5 shows the rear attachment of the bonding pads 54A–54D on the trailing edge surface 52B of the slider 16 onto the corresponding bonding pads 42A–42D on the flexure 14 via a plurality of bonding joints 22. In like manner, FIG. 6 shows the front attachment of the bonding pads 56A and 56B on the leading edge surface 52A of the slider 16 onto the corresponding bonding pads 44A and 44B on the flexure 14 via a plurality of other bonding joints 22.

Figure 7:
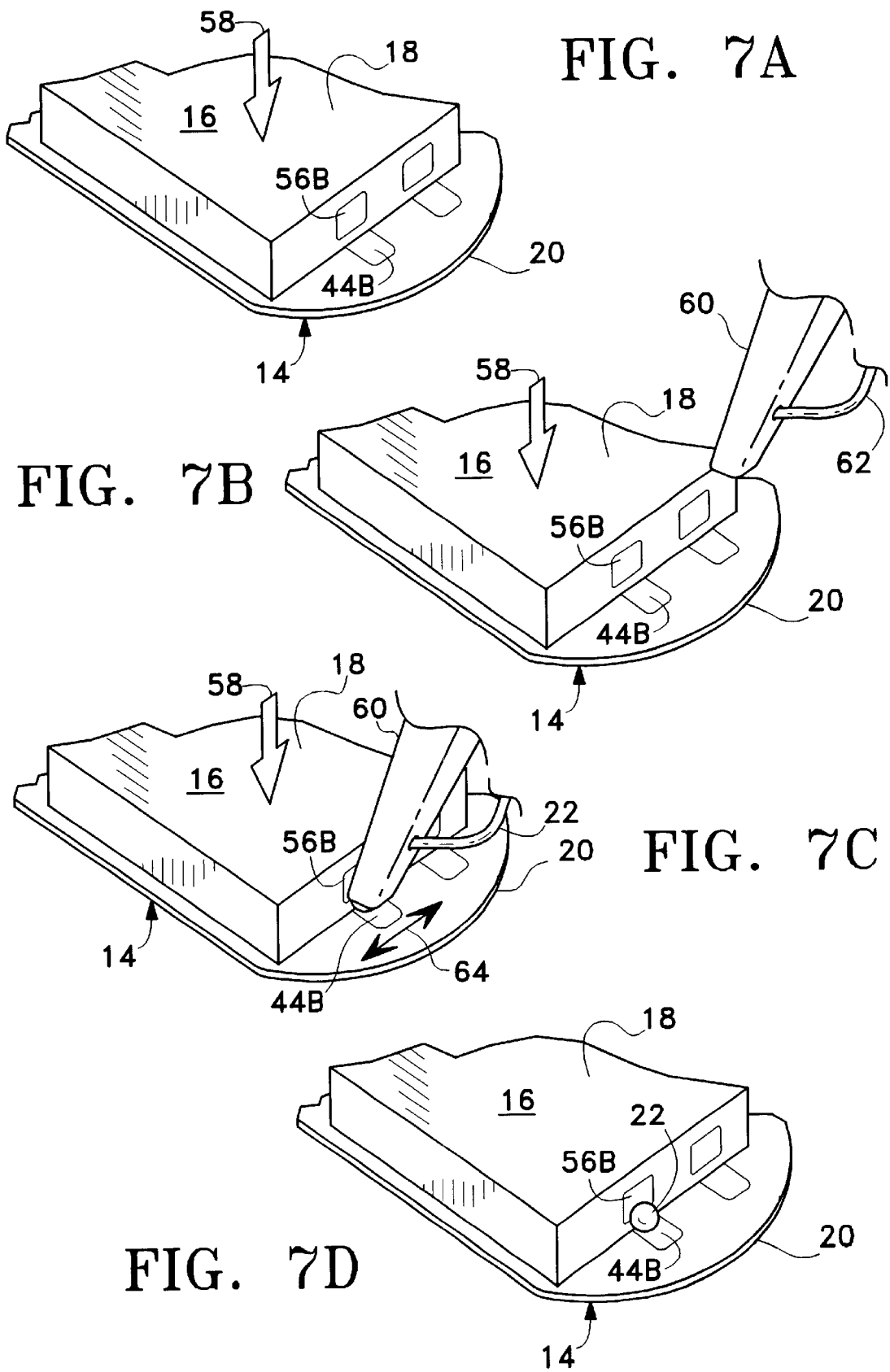
FIGS. 7A–7D are sequential views illustrating the ultrasonic bonding process in accordance with the invention.

The bonding joints 22 can be affixed to the bonding pads by different methods of bonding, such as thermocompression or ultrasonic. In the preferred embodiment, the ultrasonic method is used. FIGS. 7A–7D are sequential drawings schematically illustrating an attachment of a bonding joint 22 onto the two bonding pads 56B and 44B. First, after proper alignment of the slider 16 onto the tongue portion 20 of the flexure 14, a compression force in the direction of arrow 58 is mildly but snugly applied onto the ABS 18 of the slider 16 as shown in FIG. 7A. A stylus 60 carrying a wire 62 made of the same material as the bonding joints 22 is positioned as shown in FIG. 7B. After the stylus 60 is correctly positioned, a burst of ultrasonic vibrations 64 (represented by the bidirectional arrow) is applied to the stylus 60 as shown in FIG. 7C. Thereafter, the wire 62 is severed through an internal cutter (not shown) inside the stylus 60. The combination of pressure and vibration accomplishes the joining of the bonds 22 onto the pads 56B and 56D as shown in FIG. 7D.

In the preferred embodiment, the material for the pads 54A–54D, 42A–42D, 56A, 56B, 44A, 44B and the bonding joints 22 can be of any of the inert metals such as gold (Au) or silver (Ag). As an alternative, other metals such as copper (Cu), aluminum (Al), or tin/lead (Sn/Pb) alloy can also be used. With metal as a conductor, instead of metal-doped adhesives, the resistance of the ESD path as realized by the bonding on the leading edge surface 52A, as shown in FIG. 6, can be within the milli-ohm range.

Figure 8:
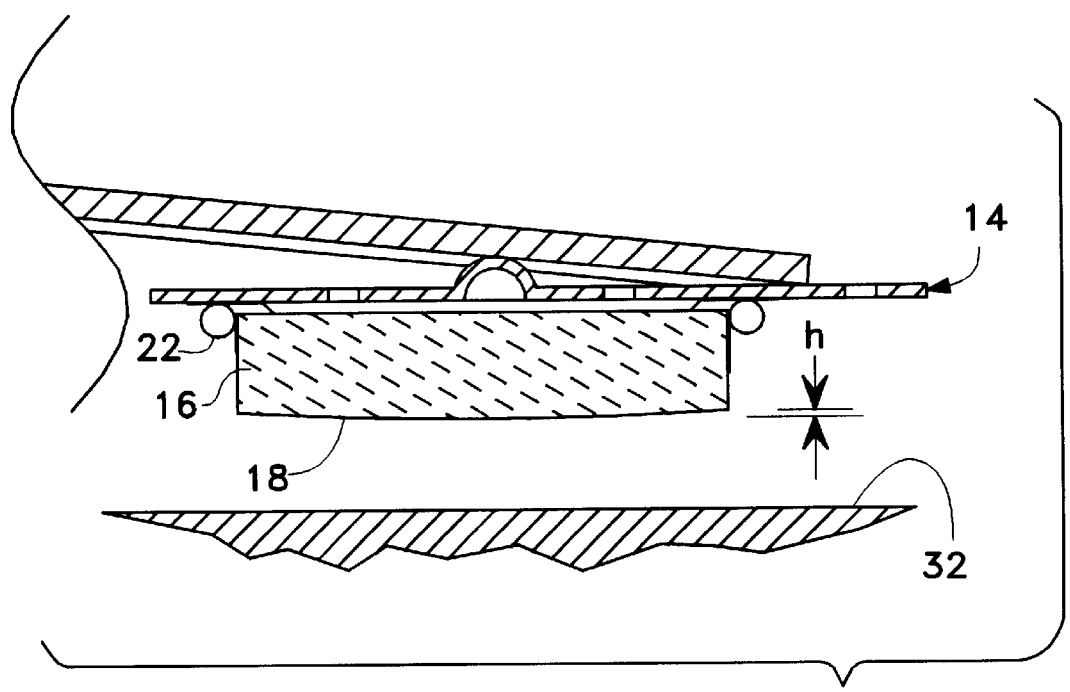
FIG. 8 is a cross-sectional side view showing the effect on the slider's air bearing surface curvature by the attachment process of the invention.
Figure 9:
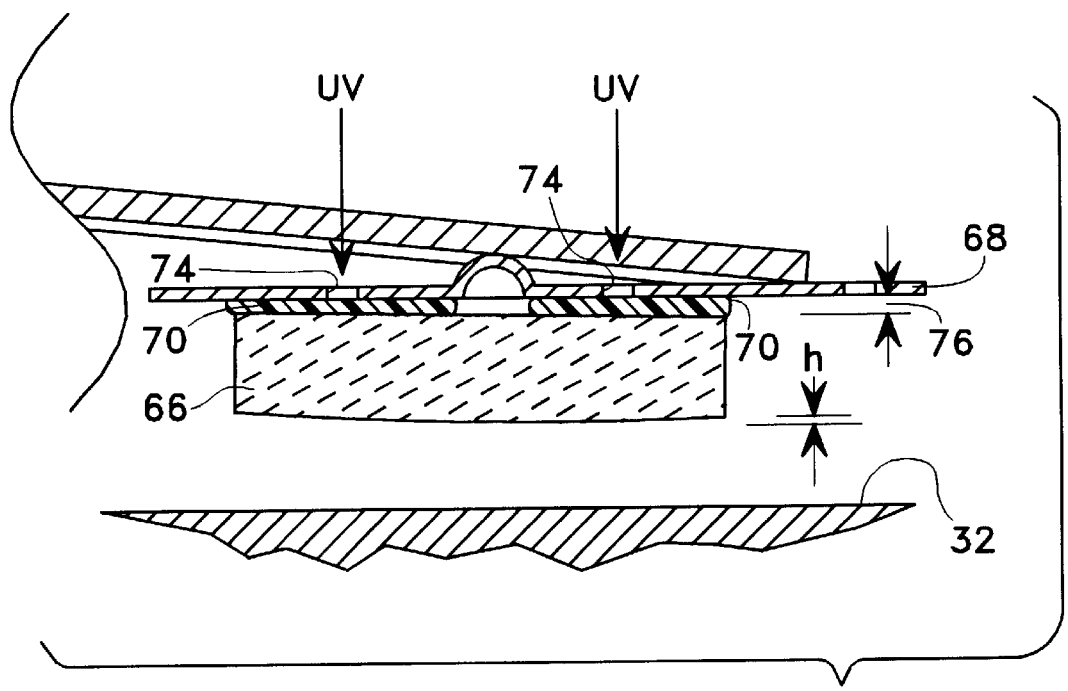
FIG. 9 is a cross-sectional side view showing the effect on the slider's air bearing surface curvature when using the prior art attachment process.

By virtue of this invention, a reduction in manufacturing steps is realized and the slider 16 is also more precisely bonded onto the flexure 14. FIG. 8 is an enlarged cross-sectional view of the slider 16 of the invention which includes a slightly curved ABS 18 characterized by a convex height h with reference to an otherwise planar surface. The curved ABS of the slider 16 is physically ground to facilitate the slider's take off or landing during normal usage. The convex height h is typically less than a micron. With the slider 16 attached in accordance with the invention, the orientation of the slider 16 can be mounted with reasonable predictability, thereby correctly positioning the slider with respect to the disk surface 32, in contrast to a corresponding prior art method of slider mounting. FIG. 9 shows a prior art slider 66 attached to the flexure 68 by use of epoxy 70. In accordance with the prior art method, the glue pattern for the epoxy 70 is of critical importance in the final orientation of the ABS 72 with respect to the disk surface 32. The shape and volume of the cured epoxy controls the eventual positioning of the slider 66 relative to the disk surface 32. For example, if the epoxy 70 is initially applied in a skewed attitude, a tilted slider 66 would result which would adversely affect the aerodynamics of the flying slider 66.

During the epoxy attachment of the prior art slider 66 onto the flexure 68 during the curing process, the dosage of UV light exposure has to be carefully controlled. Typically, several openings 74 have to be formed on the flexure 68 as shown in FIG. 9. UV light is then illuminated from the back side of the flexure 68 through the openings 74. The clearance gap 76 between the slider 72 and the flexure 66 allows the UV light to disperse and permeate the epoxy 70. If the openings 74 are too large, the remaining area on the flexure 66 for retaining the epoxy is decreased resulting in reduction in attachment force. On the other hand, if the openings 74 are too small, there may be insufficient UV light to pass through, thereby yielding a spotty pattern of uncured adhesives which seriously affects reliability. The magnetic head suspension assembly of this invention does not use epoxy and thus is capable of avoiding all the aforementioned problems.

It should be understood that modifications and variations of the magnetic head structure described above are possible within the scope of the invention. For example, the areas of attachment of the slider 16 to the flexure 14 need not be confined to the trailing and leading edge surfaces 52A and 52B. It is possible to have the attachment on a combination of other edge surfaces, including the side edge surfaces 52C and 52D, as long as the slider 16 can be securely attached to the flexure 14. Other materials for the bonding pads 54A–54D, 42A–42D, 56A, 56B, 44A, 44B and the bonding joints 22 than those described may be used effectively. The invention need not be limited to a hard drive configuration, but may be implemented with other types of storage systems. The invention can be used in a multi-head structure as well as a single head structure.

What is claimed is:

1. A magnetic head suspension assembly comprising:
    an air bearing slider having a leading edge and a trailing edge;
    bonding pads disposed on said leading and trailing edges; and
    a flexible member having an attachment surface, and metallic bonding joints for fixedly attaching said bonding pads to said attachment surface via ultrasonic means for securing said slider to said flexible member without adhesive.

2. The magnetic head suspension assembly as set forth in claim 1, wherein said bonding joints are made of a material selected from a group consisting essentially of gold, silver, aluminum, copper, and tin-lead alloy.

3. The magnetic head suspension assembly as set forth in claim 1, including a plurality of signal traces formed on said attachment surface, said bonding pads on said trailing edge of said slider being electrically connected to said plurality of signal traces.

4. The magnetic head suspension assembly as set forth in claim 3, wherein said attachment surface of said flexible member includes an electrostatic discharge path, said bonding pads on said leading edge of said slider being electrically connected to said electrostatic discharge path.

5. The magnetic head suspension assembly as set forth in claim 3, wherein the magnetic head of said head suspension assembly includes a magnetic transducer, said signal traces being electrically connected to said transducer.

6. The magnetic head suspension assembly as set forth in claim 5, wherein said attachment surface of said flexible member includes an electrostatic discharge path, said bonding pads on said leading edge being electrically connected to said electrostatic discharge path.

7. A magnetic head suspension assembly for supporting a magnetic head which interacts with a storage medium comprising:
    a load beam;
    an air bearing slider having a leading edge, a trailing edge, an air bearing surface and an inactive surface, said air bearing slider having at least one magnetic transducer disposed thereon;
    a plurality of bonding pads disposed on said trailing and leading edges;
    a flexible member having a proximal end and a distal end, said proximal end of said flexible member being fixedly attached to said load beam, said distal end of said flexible member being affixed to said inactive surface of said slider by fixedly attaching said bonding pads via ultrasonic means without adhesive to said distal end of said flexible member.

8. The magnetic suspension assembly as set forth in claim 7, wherein said flexible member includes an electrostatic discharge path and a plurality of electrical signal traces, said bonding pads on said leading edge being electrically connected to said electrostatic discharge path, said bonding pads on said trailing edge being electrically connected to said plurality of electrical signal traces.

9. The magnetic suspension assembly as set forth in claim 8, wherein said plurality electrical of signal traces are connected to said magnetic head.

10. The magnetic suspension assembly as set forth in claim 7, wherein said bonding pads and joints are made of a material selected from a group consisting essentially of gold, silver, aluminum, copper, and tin-lead alloy.

11. A magnetic head suspension assembly comprising:
- an air bearing slider having an air bearing surface and a plurality of leading and trailing edge surfaces substantially perpendicular to said air bearing surface;
- bonding pads disposed on said leading and trailing edge surfaces; and
- a flexible member having an attachment surface which includes a plurality of electrical signal traces and an electrostatic discharge path, said flexible member being fixedly attached by metallic bonding joints without adhesive to said bonding pads at said leading and trailing edge surfaces via ultrasonic means for securing said slider to said attachment surface such that at least one of said bonding pads at said leading edge surface is electrically connected to said electrostatic discharge path and at least another of said bonding pads at said trailing edge surface is electrically connected to one of said plurality of electrical signal traces.

12. The magnetic head suspension assembly as set forth in claim 11, wherein two of said bonding pads are disposed on said leading edge and are electrically connected to said electrostatic discharge path, and four of said bonding pads are disposed on said trailing edge and are electrically connected to said plurality of electrical signal traces.

* * * * *